UNITED STATES PATENT OFFICE 2,524,082

PREPARATION OF THIAZOLYL AND THIAZOLINYL DITHIOCARBAMATES

Edmond J. Ritter, Wyandotte, Mich., and Correl N. Robinson, Topeka, Kans., assignors to Sharples Chemicals Inc., a corporation of Delaware No Drawing. Application April 6, 1949,
Serial No. 85,945

15 Claims. (Cl. 260—302)

The present invention relates to a process for preparation of thiazolyl and thiazolinyl dithiocarbamates. It provides an improved process by which compounds of this type are obtained by the direct reaction of mercaptides of 2-mercaptothiazoles, and 2-mercaptothiazolines with N,N-disubstituted thiocarbamyl halides.

Proposals have heretofore been made for preparation of thiazolyl dithiocarbamates by reaction of a substituted dithiocarbamate with cyanogen chloride and subsequent condensation of the reaction product with sodium mercaptobenzothiazole. Another suggestion has been that a 2-chloroarylothiazole be reacted with a metal dithiocarbamate to produce compounds of this type. The yields in practice of these proposed processes have, however, been poor, and the processes have entailed formation of large amounts of impurities which are difficult to separate from the desired product.

In manufacture of arylothiazolyl dithiocarbamates by reaction of a 2-chloroarylothiazole with a metal dithiocarbamate, the thiazole halogen must be activated by the presence of one or more nitro groups, or other groups capable of activating the thiazole halogen, on the aryl nucleus. Thus this method is inadequate for the preparation of arylothiazolyl dithiocarbamates when an unsubstituted arylothiazolyl chloride is employed, or even when substituents are present on the aryl nucleus which are of such nature as to have no activating effect upon the halogen atom.

By the process of the present invention, excellent yields of the various arylothiazolyl (such as benzothiazolyl) dithiocarbamates are attained regardless of whether the aryl nucleus is substituted or unsubstituted. Likewise other thiazolyl dithiocarbamates and thiazolinyl dithiocarbamates, whether substituted or unsubstituted, may be prepared in good yield.

The products which may be prepared by the practice of this invention are capable of accelerating the vulcanization of rubber and, in this respect, are of particular value because of their delayed action characteristic. It is a primary object of the invention, therefore, to provide an effective and economical process for the manufacture of these valuable accelerators.

The reaction is believed to take place by simple condensation of equivalent quantities of the reactants with the elimination of the appropriate halide, the reactants which may be employed and the structure of the products thus obtained being illustrated by the following chemical equation:

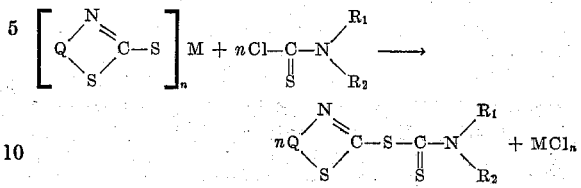

wherein Q represents a bivalent radical attached by adjacent carbon atoms to the N and the S, respectively, in completition of the characteristic, 5-atom heterocyclic ring, said radical being chosen from the group consisting of vinylene radicals, alkylene radicals, and arylene radicals in which each valence normally satisfied by hydrogen is satisfied by one of a group consisting of hydrogen, alkyl, halogen and nitro; wherein $R_1$ and $R_2$, taken individually, represent one of the group consisting of alkyl, aralkyl, aryl, and alkaryl radicals, and, taken collectively, represent a polymethylene radical; wherein M is one of a group consisting of alkali metals, alkaline earths, ammonium, and alkyl substituted ammonium radicals; and wherein $n$ is an integer equal to the valence of M.

With respect to M, examples of alkali metals are sodium and potassium; examples of alkaline earths are calcium, magnesium, strontium, and barium; and examples of alkyl substituted ammonium radicals are such radicals in which the alkyl substituents range from one to three, and in which each alkyl group has from one to five carbon atoms such as methyl, ethyl, propyl, butyl, amyl.

The thiocarbamyl halides employed in the reaction are those in which the nitrogen atom is twice substituted, for example, by alkyl, aryl, aralkyl, alkaryl, or combinations of the same, or polymethylene. Thus within the scope of the present invention, for example, there may be used thiocarbamyl chlorides in which the nitrogen is twice substituted by similar alkyl groups such as dimethyl, diethyl, dipropyl, dibutyl, diamyl, dihexyl, diheptyl, dioctyl thiocarbamyl chlorides, etc.; or by two dissimilar alkyl groups, such as methyl-ethyl, ethyl-propyl, methyl-propyl thiocarbamyl chlorides; or by a single polymethylene group such as pentamethylene, hexamethylene thiocarbamyl chlorides, etc.; or by one aryl and one alkyl group, such as phenyl-methyl, phenyl-ethyl, phenyl-propyl thiocarbamyl chlorides, etc.; or by one alkyl and one alkaryl group, such as methyl-tolyl, ethyl-tolyl, propyl-tolyl, methyl-xylyl, ethyl xylyl, propyl-xylyl, thiocarbamyl chlorides, etc.; by one alkyl and one aralkyl group, such as methyl-benzyl, ethyl-benzyl, propyl-benzyl, methyl-phenylethyl, ethyl-phenylethyl, propyl-phenylethyl thiocarbamyl chlorides, etc.; by two aryl groups, such as diphenyl; by one aryl and one alkaryl group, such as phenyl-tolyl, phenyl-xylyl, etc.; by one aryl and one aralkyl group, such as phenyl-benzyl, phenyl-phenylethyl, etc.; by two alkaryl, such as ditolyl, tolyl-xylyl, dixylyl, etc.; by two aralkyl groups, such as dibenzyl, benzyl-phenylethyl, diphenylethyl thiocarbamyl chlorides, etc.

Preferably the number of carbon atoms per hydrocarbon radical attached to the nitrogen atom does not exceed 8, and more particularly does not exceed 6.

Of particular interest are the thiazolyl and thiazolinyl dithiocarbamates in which the carbamate nitrogen is substituted by a pentamethylene group or by two identical alkyl groups containing from 1 to 8 carbon atoms in each alkyl radical.

The di-substituted thiocarbamyl chlorides are advantageously prepared by the direct chlorination of the corresponding tetrasubstituted thiuram sulfides by the method described and claimed in the co-pending application of Edmond J. Ritter, Serial No. 645,233, filed February 2, 1946, which has matured into Patent 2,466,276, granted April 5, 1949. However, any of the thiocarbamyl halides employed in our invention may be prepared by any means known in the art.

The mercaptothiazoles and mercaptothiazolines are employed in the form of the mercaptide, and they include 2-mercaptoarylthiazoles in which the arylene group may be either mono- or poly-nuclear and may furthermore be substituted by such relatively unreactive groups as halogen, alkyl and nitro. Entirely analogous to the described mercapto arylthiazoles, moreover, are the alkyl substituted mercaptothiazoles and thiazolines. Typical compounds are 2-mercaptobenzothiazole, 2-mercapto-5-nitrobenzothiazole, 2-mercapto-6-chloro-benzothiazole, 2-mercaptonaphthothiazole, 2-mercapto-4-methylthiazole, 2-mercaptothiazoline, 2-mercapto-4-methylthiazoline, 2-mercapto-4-ethylthiazoline, 2-mercapto-4-methyl-5-ethylthiazoline.

Among the compounds are those which may be more particularly illustrated by the following formulae:

1. 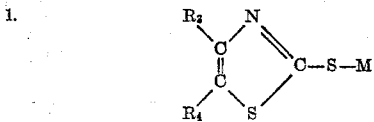

in which each of $R_3$ and $R_4$ is one of a group consisting of hydrogen and alkyl groups; and in which M is one of a group consisting of alkali metals, alkaline earths, ammonium, and alkyl substituted ammonium radicals, examples of which appear hereinabove. Examples of alkyl groups are those containing from 1 to five carbon atoms, namely, methyl, ethyl, propyl, butyl, amyl.

2. 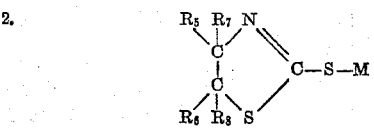

in which each of $R_5$, $R_6$, $R_7$, and $R_8$ has the same meaning as $R_3$ and $R_4$ above, and in which M has the same means as above.

3. 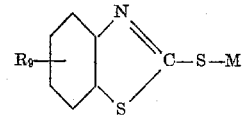

in which $R_9$ represents from 0 to 4 substituents on the phenylene nucleus, selected from the group consisting of halogen, such as chlorine and bromine, nitro, and alkyl, such as methyl, ethyl, propyl, butyl, amyl, which substituents may be the same or may be different, and in which M has the same meaning as above.

4. 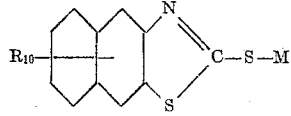

in which $R_{10}$ represents from 0 to 6 (and more particularly 0 to 4) substituents on the naphthylene nucleus selected from the same group as in the case of $R_9$, and in which M has the same meaning as above.

Thus Q may be a vinylene radical having two or more carbon atoms with the points of attachment on adjacent unsaturated carbon atoms as in Formula 1; or an alkylene radical having two or more carbon atoms with the points of attachment on adjacent saturated carbon atoms as in Formula 2; or orthoarylene as in Formulas 3 and 4.

In conducting the reaction of the mercaptide of the thiazole or thiazoline with the thiocarbamyl halide said reactants are brought together and reacted in the presence of water. The mercaptide of the thiazole or thiazoline may be introduced into the thiocarbamyl halide or, alternatively, the latter may be introduced into the former. In general, however, we prefer to introduce the thiocarbamyl halide, which may be in the form of a finely divided solid, a liquid, a solution or a suspension, into an aqueous solution of a mercaptide of the thiazole or thiazoline.

Any desired concentration of said aqueous mercaptide solution may be employed, such as up to the saturation concentration at the prevailing temperature and, in certain instances, it may even be desirable to have some of the mercaptide present in solid form. A 20% solution, for example, is very satisfactory when sodium mercaptobenzothiazole is being reacted.

The thiocarbamyl halide may be added to the aqueous solution or suspension of the mercaptide of the thiazole or thiazoline in the form of a finely divided solid, but more preferably in the molten condition or as a solution. The particular solvent employed is not highly critical, providing it be substantially inert in the reaction environment. Likewise the amount employed may vary widely, although it may often be desirable to employ sufficient solvent to maintain the halide in liquid phase. Suitable solvents, for example, include hydrocarbons, such as hexane, petroleum naphtha, benzene, toluene, etc., and chlorinated hydrocarbons such as carbon tetrachloride, chlorobenzene, etc.

It will be understood, of course, that the melting points of the substituted thiocarbamyl halides coming within the scope of this invention will differ widely and, in fact, many are liquids at temperatures well below those contemplated for the conduct of our process. In such event the non-reacting liquid, if employed, will function primarily as a diluent for the halide and, possibly, also as a solvent or melting point depressant for the product.

Regardless of the order of addition of the reactants, or of the particular physical form of the reactants prior to mixing, it is highly desirable that the reaction mixture be subjected to agitation during the progress of the reaction.

Reaction usually occurs readily at room temperature but the range of from 40° C. to 80° C. is frequently preferred. Lower temperatures may be used, but usually are attended by a reduced velocity of reaction and a reduced fluidity of the reaction mixture. Higher temperatures may be employed but consideration should be given to the thermal stability of the thiocarbamyl halide being condensed, as well as of the desired product.

The organic products of the reaction may be readily purified and may be shown by chemical analysis to correspond closely in empirical formula to the respective arylothiazolyl or other substituted or unsubstituted thiazolyl or thiazolinyl dithiocarbamates. They are highly effective vulcanization accelerators, many of which are of the delayed action type and may be so employed to advantage without purification other than the removal of inorganic by-products and incidental contaminants such as water and solvent.

The preparation of the various products in accordance with the invention is illustrated by the following specific examples:

Example 1

To 41.8 grams (0.25 mole) of 2-mercaptobenzothiazole dispersed in 200 ml. of water, was added a solution of 10.0 grams (0.25 mole) of sodium hydroxide in 50 ml. of water. The mixture was warmed to 50° C. and filtered to remove a trace of insoluble material.

Diethyl thiocarbamyl chloride (38.2 grams, 0.234 mole) was then added in 200 ml. of carbon tetrachloride. The reaction mixture was stirred for one hour at room temperature and the carbon tetrachloride was then removed by distillation. The yellow oil remaining was separated from the aqueous phase and was purified by crystallization from naphtha. There was thus recovered 46 grams of product melting in the range 78–79° C., containing 34.6% S and 9.04% N as compared with theoretical values of 34.1% S and 10.0% N for 2-benzothiazolyl-N,N-diethyl dithiocarbamate.

Example 2

119 grams (1.00 moles) of 2-mercaptothiazoline was added to 400 ml. of water at 85° C. containing 40 grams (1.0 mole) of sodium hydroxide, was then heated to boiling, cooled to room temperature, filtered and diluted with an additional 400 ml. water. The resulting solution was maintained at 25 to 30° C. and was vigorously agitated while 145 grams (0.96 mole) of diethyl thiocarbamyl chloride in liquid form was added over a period of one hour. The oil which formed did not solidify on cooling to 18° C., nor on standing over night at room temperature. The oil was extracted with 350 ml. benzene, the benzene layer separated, and benzene removed by vacuum distillation on a boiling water bath (100° C.). The residue was a reddish amber oil. Cooling for several days, treatment with various solvents, attempts at recrystallization, and prolonged standing failed to yield any crystalline material. Analysis of the product showed 40.7% S, 11.2% N, as compared to 40.97 S, 11.9% N theoretical for thiazolinyl diethyldithiocarbamate. The oil was a good rubber accelerator.

Example 3

To 94.6 grams (0.5 mole) of the sodium mercaptide of 2-mercaptobenzothiazole dissolved in water was added 84.9 grams (0.41 mole) of dibutyl thiocarbamyl chloride. The reaction was carried out as described in Example 1. The residue, a dark brown oil weighing 139 grams, was treated with ether in order to effect a separation of the unreacted 2-mercaptobenzothiazole. The yield of 2-benzothiazolyl-N,N-dibutyl dithiocarbamate amounted to 94%, this product being a viscous liquid at room temperature.

Example 4

By a procedure similar to that of Example 1, 94.6 grams (0.5 mole) of the sodium mercaptide of 2-mercaptobenzothiazole was reacted with 49.4 grams (0.4 mole) of dimethyl thiocarbamyl chloride. In this instance the crude product was oven-dried at 50° C. for three hours and was found to weigh 88.4 grams (87.2% of theory), and to melt between 98 and 101° C. When recrystallized from naphtha the 2-benzothiazolyl-N,N-dimethyl dithiocarbamate was obtained as crystals which melted between 120.4 and 123.0° C. and contained 39.0% S and 10.5% N as compared with calculated values of 37.8% S and 11.0% N.

Example 5

To 94.6 grams (0.5 mole) of the sodium mercaptide of 2-mercaptobenzothiazole was added 64.2 grams (0.322 mole) of ethyl phenyl thiocarbamyl chloride and the reaction was carried out by a procedure similar to that of Example 1. The oven-dried crude product was found to weigh 90.6 grams and to melt 105–108° C. The analysis indicated 30.7% S and 7.9% N as compared with theoretical values of 29.1% S and 8.5% N for 2-benzothiazolyl-N-ethyl-N-phenyl dithiocarbamate.

Example 6

By a procedure similar to that of Example 1, 94.6 grams (0.5 mole) of the sodium mercaptide of 2-mercaptobenzothiazole was reacted with 65.5 grams (0.4 mole) of N-pentamethylene thiocarbamyl chloride. The 2-benzothiazolyl-N-pentamethylene dithiocarbamate weighed 113.5 grams, corresponding to a yield of 96.7%.

Example 7

By a procedure similar to that of Example 1, 59.8 grams (0.25 mole) of 2-mercaptonaphthothiazole as its sodium salt is reacted with 38.2 grams (0.25 mole) of diethyl thiocarbamyl chloride. The 2-naphthothiazolyl-N,N-diethyl dithiocarbamate is obtained in about 85% yield.

Example 8

By a procedure similar to that of Example 1, 0.25 mole of 2-mercaptobenzothiazole as its sodium salt is reacted with 0.25 mole of dibenzyl thiocarbamyl chloride. Crude 2-benzothiazolyl-N,N-dibenzyl dithiocarbamate is obtained in about 90% yield.

Example 9

A sodium mercaptide solution was prepared from 90 lbs. (0.539 lb. mole) of 2-mercaptobenzothiazole, 142 lbs. of water, and 48 lbs. (0.588 lb.

mole) of 49% sodium hydroxide. To this solution was added a solution of 99 lbs. (0.539 mole) of diethyl thiocarbamyl chloride in benzene, and the reaction was carried out by the procedure of Example 1. The benzene solution, which weighed 213 lbs., was diluted with 103 lbs. of hexane, crude 2-benzothiazolyl-N,N-diethyl dithiocarbamate precipitating out. When filtered and dried this was found to weigh 107 lbs. and to melt over a range 76–79° C.

*Example 10*

60 grams (0.41 mole) of a commercial mixed alkyl mercaptothiazole (manufactured by the B. F. Goodrich Chemical Company and marketed under the trade name "Good-rite"), which consists of approximately 80% of dimethyl-2-mercaptothiazole and 20% ethyl-2-mercaptothiazole, was added, after preliminary purification treatment, to 16.5 grams (0.41 mole) of sodium hydroxide dissolved in 500 ml. of water. The resulting solution was stirred for 30 minutes at 70° C. and was filtered. To the resulting clear solution was added 61 grams (0.4 mole) of diethyl thiocarbamyl chloride over a period of 23 minutes during which time the reaction mixture was vigorously agitated and maintained at a temperature of about 25° C.

Stirring was continued for 15 minutes after all the chloride was added, and the product was then filtered, washed and air dried over night. The resulting product was a tan, fluffy powder which melted at 60–63° C. and contained 39.1% S and 8.6% N by analysis. The amount recovered was 99 grams, corresponding to a yield of 94.6%.

Although the invention has been described particularly as applied to the reaction of thiocarbamyl chlorides, it is to be understood that other halides may be employed. Thus the analogous thiocarbamyl bromides and iodides may be reacted in aqueous media with the mercaptides of thiazoles or thiazolines to give the desired thiazolyl or thiazolinyl dithiocarbamates.

It is to be understood that the more particular description given above is by way of illustration, and that various modifications are possible and will occur to persons skilled in the art upon becoming familiar herewith.

It is intended that the patent shall cover, by suitable expression in its claims, the features of patentable novelty which reside in the invention.

This application is a continuation-in-part of our copending application Serial Number 676,338, filed June 12, 1946, which has been abandoned in favor of this application.

We claim:

1. A process for the preparation of dithiocarbamic acid derivatives having the structure

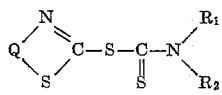

wherein Q represents a bivalent radical attached by adjacent carbon atoms to the N and the S, respectively, in completion of the characteristic 5-atom heterocyclic ring, said radical being chosen from the group consisting of vinylene radicals, alkylene radicals, and arylene radicals in which each valence normally satisfied by hydrogen is satisfied by one of a group consisting of hydrogen, alkyl, halogen and nitro; wherein $R_1$ and $R_2$, taken individually, represent one of the group consisting of alkyl, aralkyl, aryl, and alkaryl radicals, and, taken collectively, represent a polymethylene radical; comprising intimately mixing in the presence of water a compound having the structure

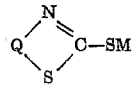

wherein M represents one of the group consisting of alkali metals, alkaline earth metals, ammonium and alkyl substituted ammonium radicals; and wherein Q has the same meaning as above, with a compound having the structure

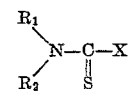

wherein $R_1$ and $R_2$ have the same meaning as above, and X represents halogen; and maintaining said reactants in mutual contact until the desired reaction has occurred.

2. A process for the preparation of thiazolyl dithiocarbamates having the structure

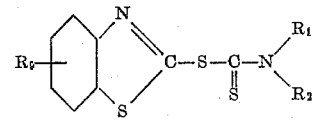

wherein $R_9$ represents from 0 to 4 substituents on the phenylene nucleus, selected from the group consisting of halogen, nitro and alkyl; and wherein $R_1$ and $R_2$, taken individually, represent one of the group consisting of alkyl, aralkyl, aryl, and alkaryl radicals, and, taken collectively, represent a pentamethylene radical; comprising intimately mixing in the presence of water a compound having the structure

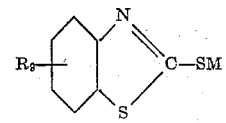

wherein M represents one of a group consisting of alkali metals, alkaline earths, ammonium and alkyl substituted ammonium radicals; and wherein $R_9$ has the same meaning as above; with a compound having the structure

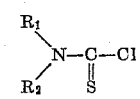

wherein $R_1$ and $R_2$ have the same meaning as above; and maintaining said reactants in mutual contact until the desired reaction has occurred.

3. A process for the preparation of thiazolyl dithiocarbamates having the structure

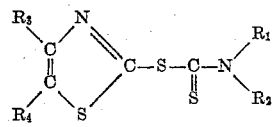

wherein each of $R_3$ and $R_4$ is one of a group consisting of hydrogen and alkyl radicals containing from 1 to 5 carbon atoms; and wherein $R_1$ and $R_2$, taken individually, represent one of the group consisting of alkyl, aralkyl, aryl, and alkaryl radicals, and, taken collectively, represent a pentamethylene radical; comprising intimately mixing in the presence of water a compound having the structure

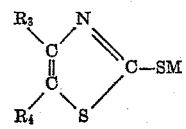

wherein M represents one of a group consisting of alkali metals, alkaline earths, ammonium and alkyl substituted ammonium radicals; and wherein $R_3$ and $R_4$ have the same meaning as above; with a compound having the structure

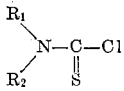

wherein $R_1$ and $R_2$ have the same meaning as above; and maintaining said reactants in mutual contact until the desired reaction has occurred.

4. A process for the preparation of thiazolinyl dithiocarbamates having the structure

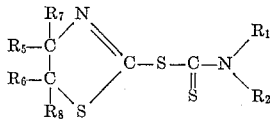

wherein each of $R_5$, $R_6$, $R_7$ and $R_8$ is one of a group consisting of hydrogen and alkyl radicals containing from 1 to 5 carbon atoms; and wherein each of $R_1$ and $R_2$, taken individually, represents one of the group consisting of alkyl, aralkyl, aryl, and alkaryl radicals, and, taken collectively, represent a pentamethylene radical; comprising intimately mixing in the presence of water a compound having the structure

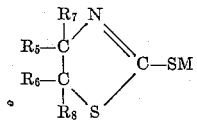

wherein M represents one of a group consisting of alkali metals, alkaline earths, ammonium and alkyl substituted ammonium radicals; and wherein $R_5$, $R_6$, $R_7$ and $R_8$ have the same meaning as above; with a compound having the structure

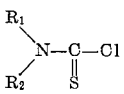

wherein $R_1$ and $R_2$ have the same meaning as above; and maintaining said reactants in mutual contact until the desired reaction has occurred.

5. The process of claim 2 in which M is sodium.

6. The process of claim 5 in which the thiocarbamyl chloride in liquid form is introduced into an agitated aqueous solution of the mercaptide.

7. The process of claim 6 in which the temperature of the reaction mixture is maintained below 80° C.

8. The process of claim 6 in which unsubstituted sodium mercaptobenzothiazole and N,N-diethylthiocarbamyl chloride are the reactants, and in which the temperature of the reaction mixture is maintained below 80° C.

9. The process of claim 2 in which M is sodium, and in which each of $R_1$ and $R_2$ is an alkyl radical containing from 1 to 6 carbon atoms.

10. The process of claim 3 in which M is sodium.

11. The process of claim 10 in which each of $R_1$ and $R_2$, when taken individually, represents an alkyl radical containing not more than 8 carbon atoms.

12. The process of claim 4 in which M is sodium.

13. The process of claim 4 in which M is sodium, and in which each of $R_1$ and $R_2$, when taken individually, represents an alkyl radical containing not more than 8 carbon atoms.

14. A method for the preparation of 2-thiazolinyl-N,N-diethyldithiocarbamate comprising intimately mixing sodium-2-mercaptothiazoline with N,N-diethylthiocarbamyl chloride in aqueous medium.

15. The process of claim 2 in which $R_9$ represents zero substituents on the phenylene nucleus, in which M is sodium, and in which each of $R_1$ and $R_2$ is an alkyl radical containing from 1 to 8 carbon atoms.

EDMOND J. RITTER.
CORREL N. ROBINSON.

REFERENCES CITED

The following references are of record in the file of this patent:

UNITED STATES PATENTS

| Number | Name | Date |
|---|---|---|
| 2,158,022 | Lichty | May 9, 1939 |

OTHER REFERENCES

Beilstein: Handbuch der Organischen Chemie, vol. 4, p. 121 citing Berichte, 26, p. 1686.